United States Patent
Que et al.

(10) Patent No.: US 10,250,896 B2
(45) Date of Patent: Apr. 2, 2019

(54) IMAGE COMPRESSING METHOD BASED ON JPEG-LS

(71) Applicant: VIA ALLIANCE SEMICONDUCTOR CO., LTD., Shanghai (CN)

(72) Inventors: Heng Que, Shanghai (CN); Deming Gu, Shanghai (CN); Zhou Hong, Cupertino, CA (US); Yuanfeng Wang, Shanghai (CN)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 189 days.

(21) Appl. No.: 15/287,857

(22) Filed: Oct. 7, 2016

(65) Prior Publication Data
US 2017/0295378 A1    Oct. 12, 2017

(30) Foreign Application Priority Data

Apr. 12, 2016 (CN) .......................... 2016 1 0224174
Jun. 8, 2016 (CN) .......................... 2016 1 0405463

(51) Int. Cl.
H04N 19/176 (2014.01)
H04N 19/17 (2014.01)
(Continued)

(52) U.S. Cl.
CPC ......... H04N 19/436 (2014.11); H04N 19/176 (2014.11); H04N 19/593 (2014.11)

(58) Field of Classification Search
CPC ...... H04N 19/00; H04N 19/17; H04N 19/172; H04N 19/174; H04N 19/176;
(Continued)

(56) References Cited

U.S. PATENT DOCUMENTS 6,128,406 A * 10/2000 Ostrovsky ............... G06T 9/005
                                                        382/162
6,507,614 B1 * 1/2003 Li ........................... H04N 19/61
                                                        375/240.03
(Continued)

OTHER PUBLICATIONS

Weinberger, Marcelo J. et al., "The LOCO-I Lossless Image Compression Algorithm: Principles and Standardization into JPEG-LS" HP L Labs Technical Reports. Hewlett-Packard Laboratories, Palo Alto, CA 94304, Nov. 12, 1999, pp. 1-34.

*Primary Examiner* — Dwayne D Bost
*Assistant Examiner* — Stephen M Brinich
(74) *Attorney, Agent, or Firm* — McClure, Qualey & Rodack, LLP

(57) ABSTRACT

An image compression method based on JPEG-LS is presented. In the method, the M×N pixels in the source image are divided into k groups. M, N, and k are all integers larger than one. Each group corresponds to a plurality of pixels among the M×N pixels. The decorrelation procedure and the context modeling procedure are performed for each of the plurality of pixels in the $i^{th}$ group of the k groups. The compensation look-up table is not refreshed until all pixels in the $i^{th}$ group are performed with the decorrelation procedure and the context modeling procedure.

8 Claims, 6 Drawing Sheets

(51) Int. Cl.
*H04N 19/436* (2014.01)
*H04N 19/593* (2014.01)

(58) Field of Classification Search
CPC .... H04N 19/177; H04N 19/179; H04N 19/70;
H04N 19/80; H04N 19/43; H04N 19/433;
H04N 19/436; H04N 19/439; H04N
19/587; H04N 19/59; H04N 19/593;
H04N 19/597; H04N 19/60; H04N 19/61;
H04N 19/615; H04N 19/619; H04N
19/62; H04N 19/625; H04N 19/63; H04N
19/635
USPC ........... 382/232–248, 166; 348/14.13, 439.1,
348/568
See application file for complete search history.

(56) References Cited

U.S. PATENT DOCUMENTS

| | | | | |
|---|---|---|---|---|
| 2007/0058866 | A1* | 3/2007 | Boyce | H04N 5/262 |
| | | | | 382/181 |
| 2008/0240587 | A1* | 10/2008 | Au | H04N 19/593 |
| | | | | 382/236 |
| 2010/0053153 | A1* | 3/2010 | Baril | H04N 19/62 |
| | | | | 345/419 |
| 2010/0232722 | A1* | 9/2010 | Park | H03M 7/40 |
| | | | | 382/239 |

* cited by examiner

IMAGE COMPRESSING METHOD BASED ON JPEG-LS

CROSS-REFERENCE TO RELATED APPLICATIONS

The present application is based on and claims priority from China Application Serial Number 201610405463.5, filed on Jun. 08, 2016, and from China Application Serial Number 201610224174.5, filed on Apr. 12, 2016, the invention of which is hereby incorporated by reference herein in its entirety.

BACKGROUND

Technical Field

The disclosure is related to an image compression method, and particularly to an image compression method based on JPEG-LS.

Related Art

JPEG-LS is an image compression standard which is lossless or approximately lossless. The standard is built for providing a more effective image compression compared with JPEG.

In practice, JPEG-LS is divided into modeling and encoding. In modeling, JPEG-LS is capable of achieving excellent decorrelation effect. The core technique of JPEG-LS is low complexity lossless compression for images (LOCO-I) algorithm. The LOCO-I algorithm utilizes the prediction for the residuals, modeling, and context-based coding. The algorithm has lower complexity than JPEG algorithm because the algorithm takes the residuals as the two-sided geometric distribution, which is also called discrete Laplace distribution, and the Golomb-like codes.

However, in the procedure of modeling, the compression value of each pixel has dependency over other pixels. Therefore, the compression procedure has to be performed pixel by pixel and the timing latency is inevitable. On the other hand, the sequence of the decompression procedure is necessarily the same as the sequence of the compression procedure, so the problem of timing latency and the inefficiency in hardware exists.

SUMMARY

The disclosure is to provide an image compression method based on JPEG-LS to conquer the timing latency problem of the conventional JPEG-LS.

The disclosure provides an image compression method based on JPEG-LS. In the disclosed method, the M×N pixels in the source image are divided into k groups. M, N, and k are all integers larger than one. Each group corresponds to a plurality of pixels among the M×N pixels. The decorrelation procedure and the context modeling procedure are performed for each of the plurality of pixels in the $i^{th}$ group of the k groups. The compensation look-up table is not refreshed until all pixels in the $i^{th}$ group are performed with the decorrelation procedure and the context modeling procedure.

As above, the disclosure provides an image compression method based on JPEG-LS to conquer the problems in the conventional JPEG-LS. In the provided method, the pixels in the source image are divided into many groups. The pixels in the source image are compressed or decompressed group by group. The compensation look-up table is not refreshed until all pixels in one group are performed with the decorrelation procedure and the context modeling procedure. Hence, the pixels in the same group may be processed in parallel so to reduce the timing latency.

In order to make the aforementioned and other features of the present invention more comprehensible, several embodiments accompanied with figures are described in detail below.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
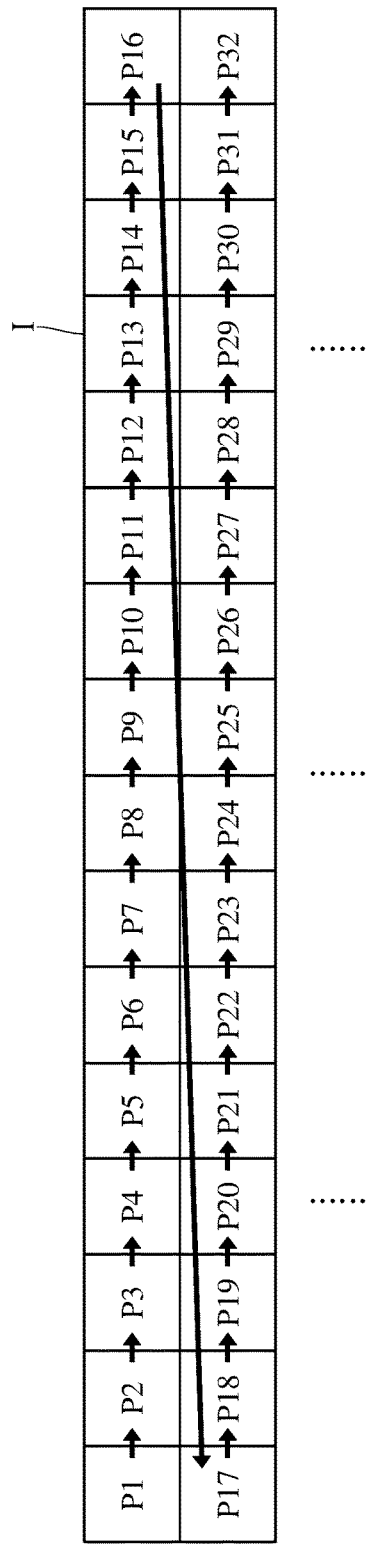
FIG. 1 is a contrary embodiment related to the image compression method according to one embodiment of the disclosure.

Please refer to FIG. 1 for illustrating JPEG-LS, wherein FIG. 1 is a contrary embodiment related to the image compression method according to one embodiment of the disclosure. As shown in FIG. 1, each row of the source image I has 16 pixels. For example, the first row of the source image I has pixels P1~P16, and the second row of the source image I has pixels P17~P32. In the embodiment, the source image I is an image under the compression process of JPEG-LS. For brief, taking pixels P1~P32 for example. However, the source image I may have any number of pixels. Besides, the number of rows and the number of columns of the source image I is not limited. For example, the source image I may have 1280×768 pixels.

The arrows between pixel P1 and pixel 32 in FIG. 1 illustrate the processing sequence for compressing the source image with conventional JPEG-LS. As shown in FIG. 1, in the processing sequence of the conventional JPEG-LS, the pixels are performed with the compression procedure from left to right, from top to bottom, and with the sequence from pixel P1 pixel P2 to pixel P32. The processing sequence is for example, there are other possible embodiments well known for the person having skill in the art and the disclosure is not to discuss those embodiments here. In the embodiments below, a pixel under processing is defined as a current pixel.

Figure 2:
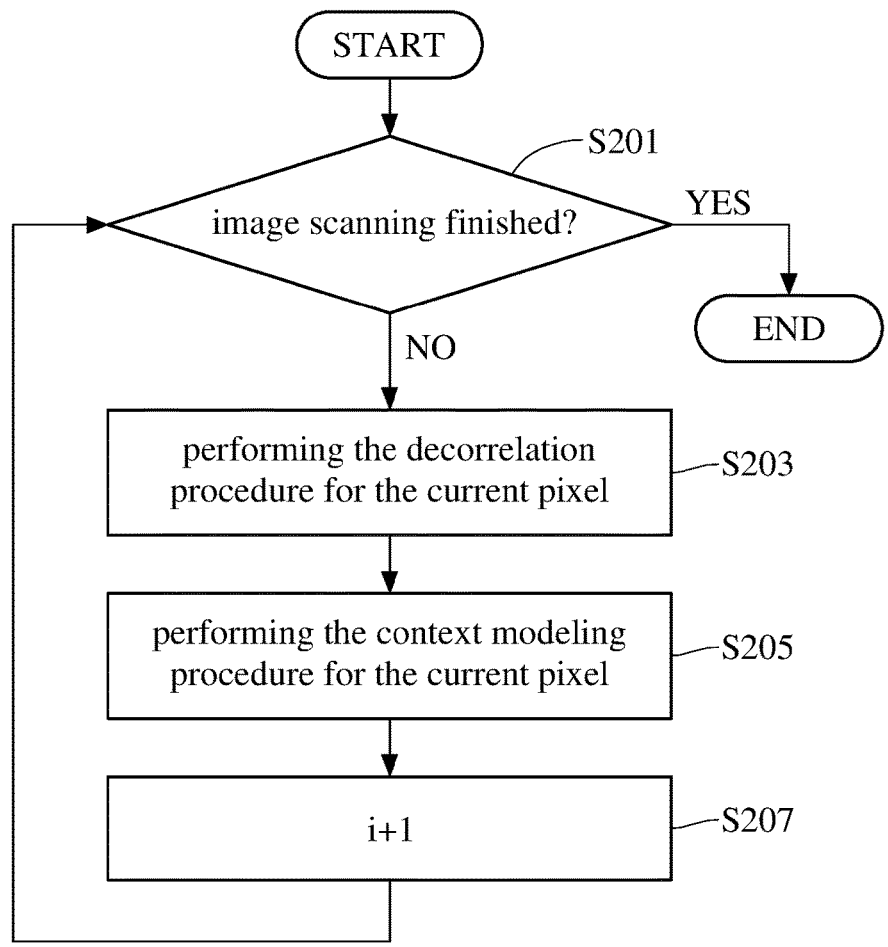
FIG. 2 is a flowchart of the contrary embodiment of the disclosure.

Please refer to FIG. 2 for more detail in JPEG-LS, wherein FIG. 2 is a flowchart of the contrary embodiment of the disclosure. After the processing procedure of JPEG-LS starts, in step S201, whether the image scanning is finished is determined. The image scanning means to process the pixels with the aforementioned sequence. The image scanning is finished when the image compression procedure is accomplished, or an error occurs in the image compression procedure, or any other event occurs. If the image scanning is finished, the processing procedure is ended; otherwise, the procedure goes to the step S203.

Figure 3:
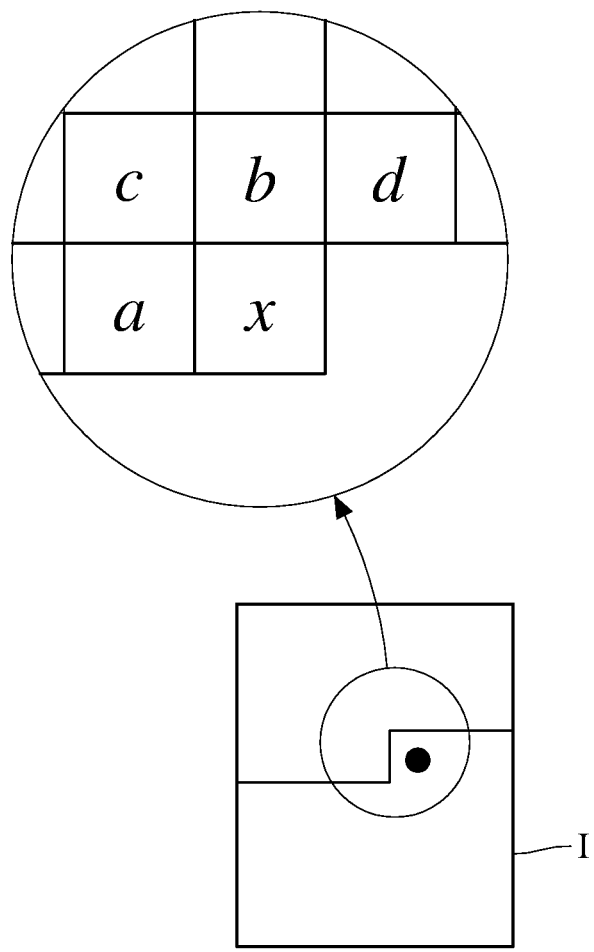
FIG. 3 illustrates a current pixel and corresponding parameters.

Please refer to FIG. 2 and FIG. 3 together for understanding the subsequent steps, wherein FIG. 3 illustrates a current pixel and corresponding parameters. In FIG. 3, there is a current pixel value x, a surrounding pixel value a, a surrounding pixel value b, a surrounding pixel value c, and a surrounding pixel value d. The current pixel value x means the pixel value of the current pixel, which is the pixel under the compression process. The surrounding pixel values a to d relate to the pixel value of the pixel on the left of, in the upper left of, on the top of, and on the upper right of the current pixel. For example, when the pixel P20 is the current pixel, the surrounding pixels include pixel P19, pixel P3, pixel P4, and pixel P5.

In step S203, the current-processed pixel is performed with the decorrelation procedure. The decorrelation procedure is to obtain a predicted pixel value xp of the current-processed pixel with a constant operator. In one embodiment, the formula of the constant operator is shown in equation (1):

$$x_p \triangleq \begin{cases} \min(a, b), & \text{if } c \geq \max(a, b) \\ \max(a, b), & \text{if } c \leq \min(a, b) \\ a + b - c, & \text{otherwise} \end{cases} \quad (1)$$

In equation (1), a, b, and c are pixel values of the surrounding pixels, and the predicted pixel value xp is the predicted value of the pixel value of the pixel x. In other words, when the pixel value c of the surrounding pixels is the largest pixel value among the pixel values a, b, and c, the predicted pixel value xp is set to be the smaller one among the pixel values a and b. When the pixel value c of the surrounding pixels is the smallest pixel value among the pixel values a, b, and c, the predicted pixel value xp is set to be the larger one among the pixel values a and b. Otherwise, the predicted pixel value xp is set as (a+b−c).

In step S205, the context modeling procedure is performed for the current-processed pixel. In the context modeling procedure, a gradient vector g corresponding to the current-processed pixel x is calculated based on the pixel values a, b, c, and d of the surrounding pixels first. The gradient vector g has element g0, element g1, and element g2. The elements g0, g1, and g2 of the gradient vector g is defined based on the pixel values a, b, c, and b according to equation (2) through equation (5).

$$g=(g2,g1,g0) \quad (2)$$

$$g0=d-b \quad (3)$$

$$g1=b-c \quad (4)$$

$$g2=c-a \quad (5)$$

Then, in the context modeling procedure, the gradient vector g is quantized to obtain a quantized gradient vector q. The quantized gradient vector q is shown in equation (6).

$$q=(q2,q1,q0) \quad (6)$$

In one embodiment, element g0, element g1, and element g2 are represented in the format of one byte (8 bits). In this embodiment, element q0 is represented with the 3 most significant bits (MSB's) of the element g0; element q1 is represented with the 3 MSB's of the element g1; element q2 is represented with the 3 MSB's of the element g2. However, the embodiment is not to limit how to derive the quantized gradient vector q.

Then, the index of compensation value ri is obtained according to the quantized gradient vector q. In one embodiment, the index of compensation value ri is the product of the elements q0, q1, and q2 of the quantized gradient vector q, as shown in equation (7).

$$ri=q2 \times q1 \times q0 \quad (7)$$

Then, the index of compensation value ri is used for getting one context from the compensation look-up table RA as the compensation value R, as shown in equation (8).

$$R=RA[ri] \quad (8)$$

In anther embodiment, the compensation look-up table RA is a three-dimensional array, and the quantized gradient vector q is used as the index of compensation value ri to obtain the compensation value R from the compensation look-up table RA. How to obtain the index of compensation value ri with the quantized gradient vector q and how to obtain the compensation value R according to the index of compensation value ri is not limited to the embodiments above. A person having ordinary skill in the art should be capable of obtaining analogous methods. In theory, the sum of the predicted value xp and the compensation value R is approximately equal to the pixel value x. However, there still exists a difference between the pixel value x and the sum of the predicted value xp and the compensation value R. In the context modeling procedure, a residual value s is obtained according to the pixel value x and the sum of the predicted value xp and the compensation value R. Further, the elements in the compensation look-up table RA are refreshed according to the residual value s. The residual value s is the compressed value of the pixel value x.

After the step S205, the step S207 is performed. In step S207, the value i is increased by one and then go back to step S201, which means to process the next pixel. With the above procedure repeated, the compressed values corresponding to all pixels are obtained.

Similar to the compression procedure of JPEG-LS, in the decompression procedure of JPEG-LS, the decorrelation procedure and the context modeling procedure are executed with the same sequence as the image is compressed so as to obtain the decompressed pixel value x̂. The detail procedure is familiar to a person having ordinary in the art and is not discussed in the disclosure.

In the procedure of compression or the procedure of decompression, each pixel should be processed with the decorrelation procedure and the context modeling procedure. In the context modeling procedure, the elements in the compensation look-up table RA should be refreshed according to the corresponding decorrelation procedure. Further, the decorrelation procedure and the context modeling procedure for a latter pixel depend on the refreshed compensation look-up table RA. Hence, the aforementioned method results in the dependency between pixels in both the compression procedure and the decompression procedure, so it is necessary to perform context modeling procedure pixel by pixel and the timing latency is increased. Besides, the hardware is capable of processing one pixel at a time with the aforementioned method, so the ability of parallel computation of the hardware is wasted. Because the context procedure is necessary for both of the compression procedure and decompression procedure of JPEG-LS, there are large timing latency and hardware inefficiency problems in both of the compression procedure and decompression procedure of JPEG-LS.

Figure 4:
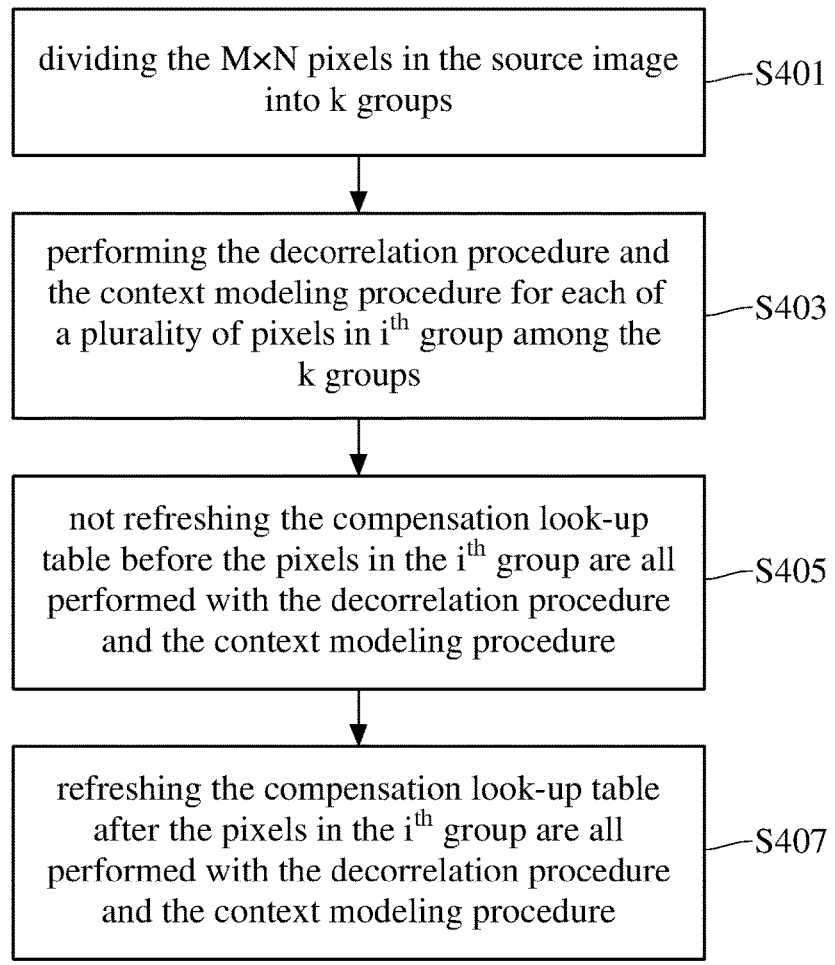
FIG. 4 illustrates a flowchart of the image compression method based on JPEG-LS according to one embodiment of the disclosure.

Please refer to FIG. 4, which illustrates a flowchart of the image compression method based on JPEG-LS according to one embodiment of the disclosure. As shown in FIG. 4, in the step S401, the M×N pixels in the source image are divided into k groups. M, N, and k are integers larger than one, and each group corresponds to a plurality of pixels among the M×N pixels. In the step S403, each of the plurality of pixels in the $i^{th}$ group among the k groups is performed with the decorrelation procedure and the context modeling procedure. In step S405, before the pixels in the $i^{th}$ group have not yet been performed with the decorrelation procedure and the context modeling procedure, the compensation look-up table corresponding to the context modeling procedure is not refreshed. In step S407, after all of the pixels in the $i^{th}$ group have been performed with the decorrelation procedure and the context modeling procedure, the compensation look-up table is refreshed.

Figure 5:
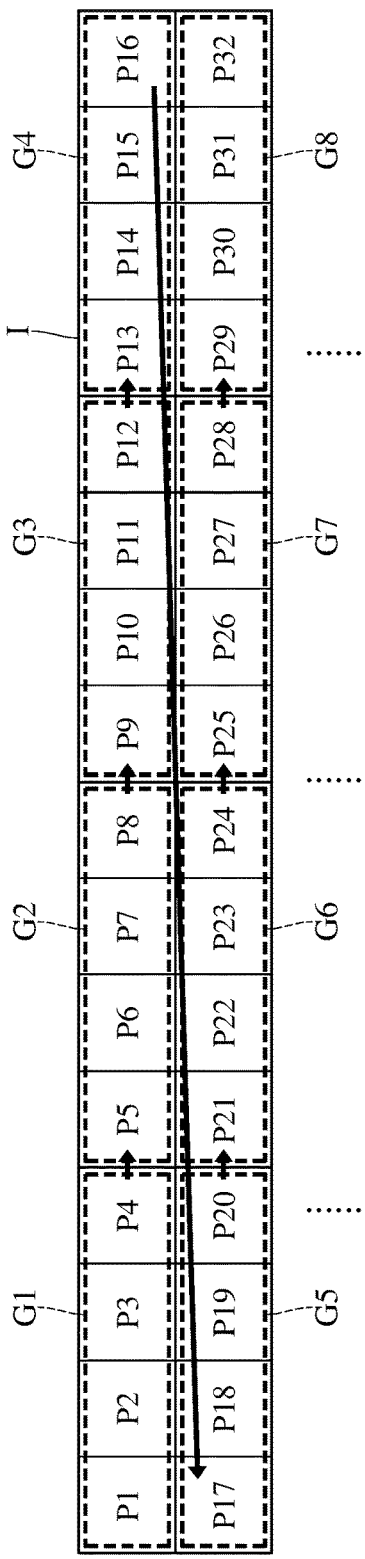
FIG. 5 illustrates a processing sequence of the image compression method based on JPEG-LS according to one embodiment of the disclosure.

Please refer to FIG. 5 for more detail, wherein FIG. 5 illustrates a processing sequence of the image compression method based on JPEG-LS according to one embodiment of the disclosure. As shown in FIG. 5, the source image I has pixels arranged in M rows and N columns. Each row among the M rows of pixels is divided into k groups. In the embodiment, N is equal to 16 and k is equal to 4, which means that each row of pixels in the source image I has 16 pixels and each group has 4 pixels. Further, as shown in FIG. 5, the groups G1 through G8 are processed in sequence as illustrated by the arrows, and group by group are processed with the steps illustrated in FIG. 4. Taking group G1 through group G8 among the k groups for example. Specifically, k is an integer larger than one. In another embodiment, each group has more than four pixels. In yet another embodiment, the number of the pixels in each group is the power of two. In still another embodiment, each row is divided into x groups and x is a positive integer. In yet still another embodiment, k is larger than N, so each group has pixels in different rows in source image I. The aforementioned embodiments are not for limitations, but for examples only.

Please refer to FIG. 4 and FIG. 5. First, each pixel in the group G1 is performed with the decorrelation procedure and the context modeling procedure without refreshing the compensation look-up table RA. After the residual values corresponding to the pixels in the group G1 are all obtained, the compensation look-up table RA is refreshed according to the obtained residual values. After the compensation look-up table RA is refreshed according to the residual values of the pixels in the group G1, each pixel in the group G2 is performed with the decorrelation procedure and the context modeling procedure. The way refreshing the compensation look-up table according to the residual values of the pixels is well known in the field and the detail is not to be discussed in the disclosure.

The mechanism of the method above is depicted as below. The pixel values of the adjacent pixels are probably very similar to each other, so the predicted pixel values with enough accuracy are able to be generated without refreshing the compensation look-up table RA. With the disclosed methods, the time for refreshing the compensation look-up table RA is reduced. Further, the dependency between the compression procedures or the decompression procedures for pixels in the same group are also reduced, so the pixels in the same group can be performed with the decorrelation procedure and the context modeling procedure in parallel, which means that more than one pixel is performed with the decorrelation procedure/context modeling procedure at the same time.

Figure 6:
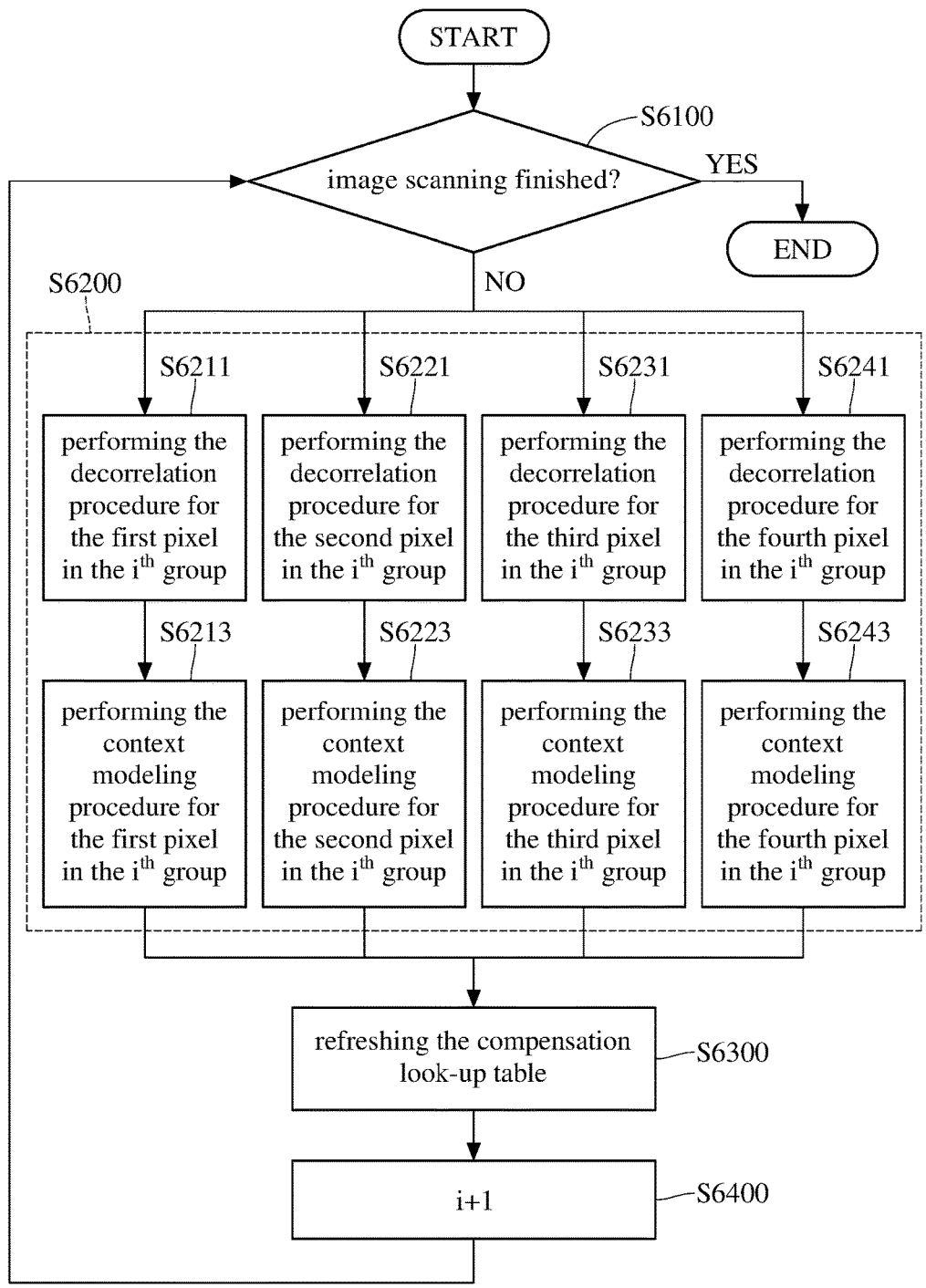
FIG. 6 is a flowchart of the parallel processing in the image compression method based on JPEG-LS according to one embodiment of the disclosure.

Please refer to FIG. 6, which is a flowchart of the parallel processing in the image compression method based on JPEG-LS according to one embodiment of the disclosure. As show in FIG. 5, each of the groups G1 to G8 has 4 pixels respectively. Taking the group G1 for example, in the image compression method based on JPEG-LS disclosed in the disclosure, it needs not to refresh the compensation look-up table RA according to information corresponding to the pixel P1 when processing the pixel P2. Hence, after the step S6100, the pixel P1 and the pixel P2 are able to be processed at the same time. Explicitly, in step S6200, pixel P1 pixel P2, pixel P3, and pixel P4 are performed with the decorrelation procedure, such as step S6211, step S6221, step S6231, and step S6241, and the context modeling procedure, such as step S6213, step S6223, step S6233, and step S6243. After the aforementioned steps are performed, the method goes to step S6300 to refresh the compensation look-up table RA. Afterwards, the value of i is increased by one in step S6400, which means to process the group G2 with the refreshed compensation look-up table RA. In other words, there are four pixels compressed at the same time with this embodiment. On the contrary, there is only one pixel compressed at a time in the contrary embodiment. The timing latency is reduced and the hardware resources are well utilized with the parallel processing of the proposed method. The embodiment is for example, and the number of pixels processed in parallel is not limited to the embodiment.

Conventionally, the source image I is compressed or decompressed in block mode. In the block mode, the source image I is divided into a plurality of blocks, and the pixels in each block is processed with the decorrelation procedure and the context modeling procedure as depicted in FIG. 2. The block mode may reduce the timing latency, but the block mode influences the dependency of the context modeling procedure and results in the loss of compression rate. Please refer to table 1 for the comparison between the method proposed in the disclosure and the block mode.

TABLE 1

|  | 16 × 16 pixels in a block | 32 × 16 pixels in a block | 32 × 32 pixels in a block |
| --- | --- | --- | --- |
| pixel by pixel | 0.488133 | 0.385411 | 0.333877 |
| 16 pixels in a group | 0.503995 | 0.396596 | 0.339926 |
| 32 pixels in a group | 0.510768 | 0.401019 | 0.34302 |
| 64 pixels in a group | 0.537227 | 0.406356 | 0.346753 |

The table shows the average compression rate when the source images from a plurality of formats are performed with the image compression method based on JPEG-LS disclosed in the disclosure in different block modes. The second column shows the results when the source images are compressed in block mode with 16×16 pixels in one block, and the third column shows the results when the source images are compressed in block mode with 32×16 pixels in one block, and the fourth column shows the results when the source images are compressed in block mode with 32×32 pixels in one block. The second row shows the results when the source images are compressed pixel by pixel with the conventional JPEG-LS, and the third row shows the results when the source images are compressed with the disclosed image compression method based on JPEG-LS with 16 pixels in one group, and the fourth row shows the results when the source images are compressed with the disclosed image compression method based on JPEG-LS with 32 pixels in one group, and the fifth row shows the results when the source images are compressed with the disclosed image compression method based on JPEG-LS with 64 pixels in one group.

It can be seen from the table 1 when the number of the pixels in one block is reduced, the loss of compression rate is increased. However, it can also be seen from the table 1 that the loss of compression rate can be neglected because the worst case shown in the table is about 5%. Explicitly, when the source images are compressed with the image compression method based on JPEG-LS as disclosed in the disclosure with 64 pixels in one group, the loss of compression rate is at most 5% (from 48.8% to 53.7% as shown in the second column) when the timing latency is reduced to 2% compared with the conventional JPEG-LS which the source image is compressed pixel by pixel.

If the hardware is capable of performing the process of compression, including the decorrelation procedure and the context modeling procedure, for 64 pixels in parallel, the timing latency is reduced to 1/64 compared with the conventional JPEG-LS. Further, as shown in the fifth row and the fourth column, the loss of compression rate may be less than 2% (from 33.4% to 34.7%) when the image compression method based on JPEG-LS according to the disclosure is utilized. In other words, the image compression method based on JPEG-LS according to the disclosure is capable of significantly reducing the timing latency while the loss of compression rate increases slightly.

As above, the disclosure provides an image compression method based on JPEG-LS to conquer the problem in the conventional JPEG-LS. In the image compression method according to the disclosure, the pixels in the source image are divided into a plurality of group. The pixels in the source image are compressed and/or decompressed in a group. The compensation look-up table is not refreshed until the decorrelation procedure and the context modeling procedure for the pixels in one group are both accomplished. Hence, the pixels in one group are processed in parallel and the timing latency is reduced while the compression rate is approximately kept.

What is claimed is:

1. An image compression method based on JPEG-LS performed by a computer hardware, comprising:
    dividing M×N pixels in a source image into k groups, wherein M, N, and k are integers larger than one, and each of the groups corresponds to a plurality of pixels among the M×N pixels;
    performing a decorrelation procedure and a context modeling procedure for each of the pixels in $i^{th}$ group of the k groups;
    not refreshing a compensation look-up table corresponding to the context modeling procedure before the decorrelation procedure and the context modeling procedure for the plurality of pixels in the $i^{th}$ group are accomplished; and
    refreshing the compensation look-up table after the decorrelation procedure and the context modeling procedure for the plurality of pixels in the $i^{th}$ group are accomplished.

2. The method in claim 1, wherein M is an amount of rows of the pixels in the source image, and N is an amount of columns of the pixels in the source image.

3. The method in claim 2, wherein k is larger than or equal to N.

4. The method in claim 2, wherein, in the step of dividing the M×N pixels in the source image into the k groups, each of the M rows of pixels in the source image is divided into x sub-groups, and x is a positive factor of N.

5. The method in claim 1, wherein an amount of the pixels in each of the groups is 2P, and p is a positive integer.

6. The method in claim 5, wherein the amount of the pixels in each of the groups is larger than or equal to 2.

7. The method in claim 1, wherein, in the step of performing the decorrelation procedure and the context modeling procedure for each of the pixels in the $i^{th}$ group of the k groups, the decorrelation procedure and the context modeling procedure are both performed for each of the pixels in parallel.

8. The method in claim 1, wherein the step of performing the decorrelation procedure and the context modeling procedure for each of the pixels in the $i^{th}$ group of the k groups comprises:
    determining whether each of the pixels in the $(i-1)^{th}$ group is performed with the decorrelation procedure and the context modeling procedure;
    when the decorrelation procedure and the context modeling procedure are not performed for each of the pixels in the $(i-1)^{th}$ group, performing the decorrelation procedure and the context modeling procedure for each of the pixels in the $(i-1)^{th}$ group;
    when the decorrelation procedure and the context modeling procedure are performed for each of the pixels in the $(i-1)^{th}$ group, performing the decorrelation procedure and the context modeling procedure for each of the pixels in the ith group; and
    increasing a value of i.

* * * * *